United States Patent
Masuzaki

(10) Patent No.: US 7,306,485 B2
(45) Date of Patent: Dec. 11, 2007

(54) WATERPROOF DEVICE

(75) Inventor: Yasuhiro Masuzaki, Tokyo (JP)

(73) Assignee: Hirose Electric Co., Ltd., Tokyo (JP)

( * ) Notice: Subject to any disclaimer, the term of this patent is extended or adjusted under 35 U.S.C. 154(b) by 0 days.

(21) Appl. No.: 11/708,483

(22) Filed: Feb. 21, 2007

(65) Prior Publication Data

US 2007/0207668 A1   Sep. 6, 2007

(30) Foreign Application Priority Data

Mar. 1, 2006   (JP) .............................. 2006-055032

(51) Int. Cl.
*H01R 13/40* (2006.01)
(52) U.S. Cl. .................................... 439/587
(58) Field of Classification Search ........ 439/587–589, 439/281
See application file for complete search history.

(56) References Cited

U.S. PATENT DOCUMENTS 5,984,724 A * 11/1999 McNeel ...................... 439/606
6,605,781 B2 * 8/2003 Milanowski et al. ..... 174/74 R
2004/0038588 A1 * 2/2004 Bernardi et al. ............ 439/587
2004/0242067 A1 * 12/2004 Oyamada et al. ........... 439/587
2006/0166554 A1 * 7/2006 Hung .......................... 439/589

FOREIGN PATENT DOCUMENTS

JP    6-33107    4/1994

* cited by examiner

*Primary Examiner*—Tho D. Ta
(74) *Attorney, Agent, or Firm*—Takeuchi & Kubotera, LLP

(57) ABSTRACT

A waterproof device includes a first housing member for covering a front portion of a connector from which a cable extends rearwardly; an elastic member for covering at least a portion of the cable; a cylindrical second housing member attached to the first housing member such that it covers and presses the elastic member against the cable; and a third housing member detachably attached to the first housing member so as to press the second housing member against the first housing member such that the second housing member covers a rear portion of the connector.

10 Claims, 5 Drawing Sheets

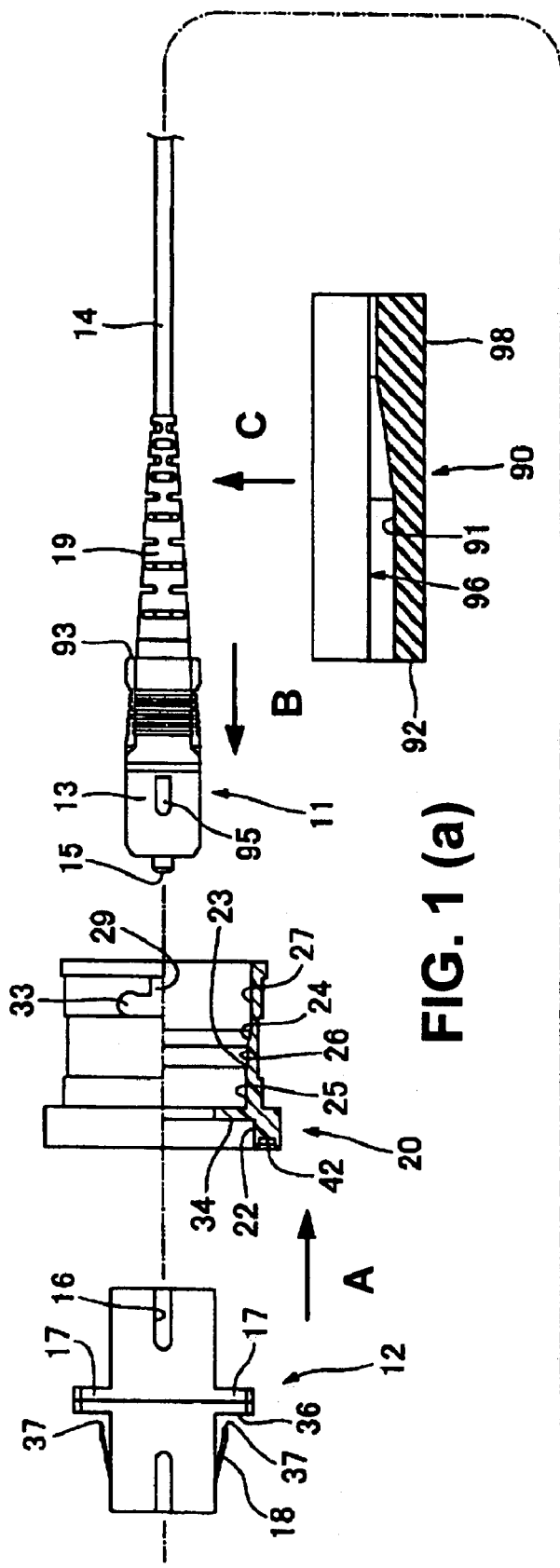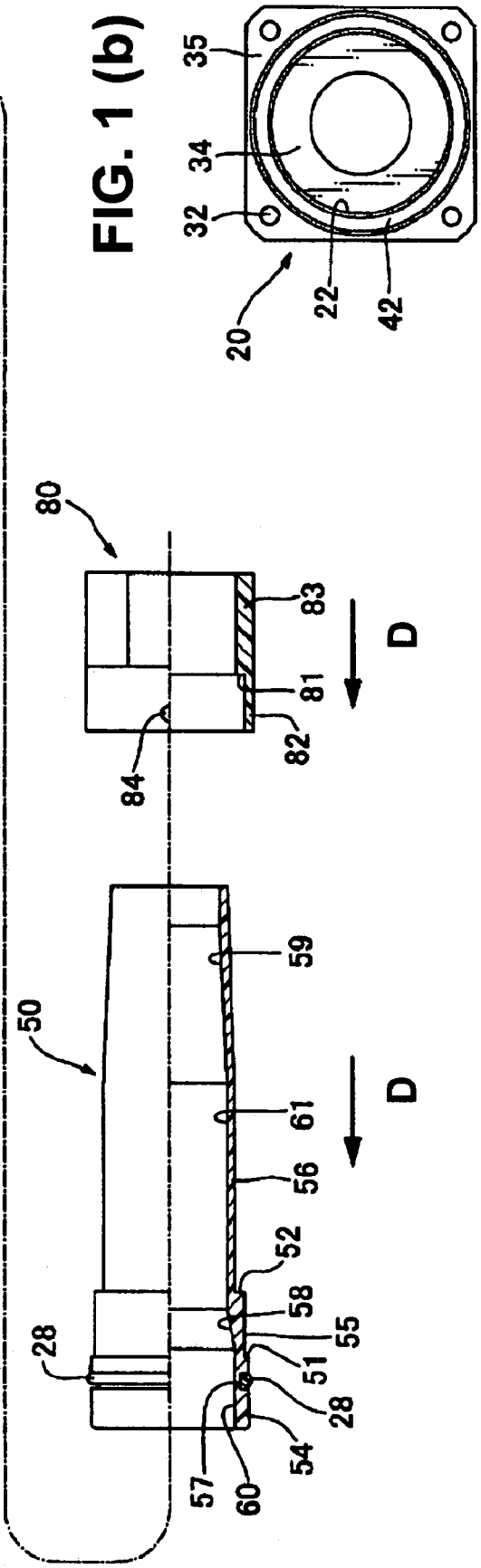

WATERPROOF DEVICE

BACKGROUND OF THE INVENTION

1. Field of the Invention

The present invention relates to waterproof devices and, particularly, to a waterproof add-on to a connector to which a cable has been connected.

2. Description of the Related Art

Japanese utility patent application Kokai No. 06-33107 discloses a waterproof device for waterproofing a connector. FIG. 5 shows such a waterproofing device. This waterproof device 5 includes a sealing member 140, a waterproof housing 160, and an O-ring 180. This is a board fixed type device. To attach it, a cable 14 is put through the waterproof housing 160 and the seal member 140 and screws 190 are driven into holes 102 in a board 100 through holes 176 of the waterproof housing 160 such that the waterproof housing 160 is closed from inside by the seal member 140 and the O-ring 180 is pressed against the board 100. To remove the waterproof device 5, it is necessary to remove the screws 190 from the board 100, and it takes time to attach or detach a connector. Where the holes 102 are closed with an adhesive to waterproof them, it becomes difficult to remove the waterproof device 5.

To assure fitting between connector components, it is necessary to position accurately the screw holes 102 and a mating connector 120. If the mating connector 120 is shifted from a fitting opening 110, close contact between the seal member 140 and the waterproof housing 160 is not guaranteed.

SUMMARY OF THE INVENTION

Accordingly, it is an object of the invention to provide a waterproof device that allows easy removal from a panel or the like after waterproofing.

It is another object of the invention to provide a waterproof device that assures accurate fitting between a pair of connectors and waterproofing the connectors.

According to the invention there is provided A waterproof device comprising a first housing member for covering a front portion of a connector from which a cable extends rearwardly; an elastic member for covering at least a portion of the cable; a cylindrical second housing member attached to the first housing member such that it covers and presses the elastic member against the cable; and a third housing member detachably attached to the first housing member so as to press the second housing member against the first housing member such that the second housing member covers a rear portion of the connector.

The second housing member is movable toward the first housing member along the cable; the third housing member is movable toward the first housing member along the cable together with the second housing member and fixed to the first housing member against an elastic force of the elastic member. The cylindrical second housing member may have a tailing section having gradually reduced diameter so that when the second housing member is moved toward the first housing member, the tailing section contracts a rear portion of the elastic member, thus pressing the rear portion against the cable.

The elastic member may have a substantially constant diameter cylindrical form that has a slit along its longitudinal direction and a central bore shaped correspondingly to the cable. The second housing member may be provided with waterproof means for closing a gap between the first and second housing member.

The waterproof means may be a ring shaped member fitted in a groove provided in a front portion of the second housing member. The second housing member may be provided with a rearwardly facing step and the third housing member may be provided with a forwardly facing step such that the rearwardly facing step abuts against the forwardly facing step to engage the second and third housing members.

The second housing member may be provided with a rearwardly facing section and the third housing member may be provided with an abutment face extending toward a center such that the rearwardly facing section abuts against the abutment face to engage the second and third housing members. The third housing member may be bayonet-connected to the first housing member.

The connector may consist of a first connector component to which the cable is connected and a second connector component detachably fitted into the first connector component. The elastic member may be attached to the first connector component. The first housing member may be attached to the second connector component. The first connector component may be fitted into the second connector component before the second and third housing members are detachably attached to the first housing member.

According to the invention, there is provided a waterproof device that is attachable to a connector to which a cable has been connected and, after waterproofing, enables to detach the connector from a panel or the like without difficulty.

BRIEF DESCRIPTION OF THE DRAWINGS

FIG. 1(a) is an exploded side view of a waterproof device according to an embodiment of the invention;

FIG. 1(b) is a front view of a housing for the waterproof device;

DESCRIPTION OF THE PREFERRED EMBODIMENTS

Figure 2:
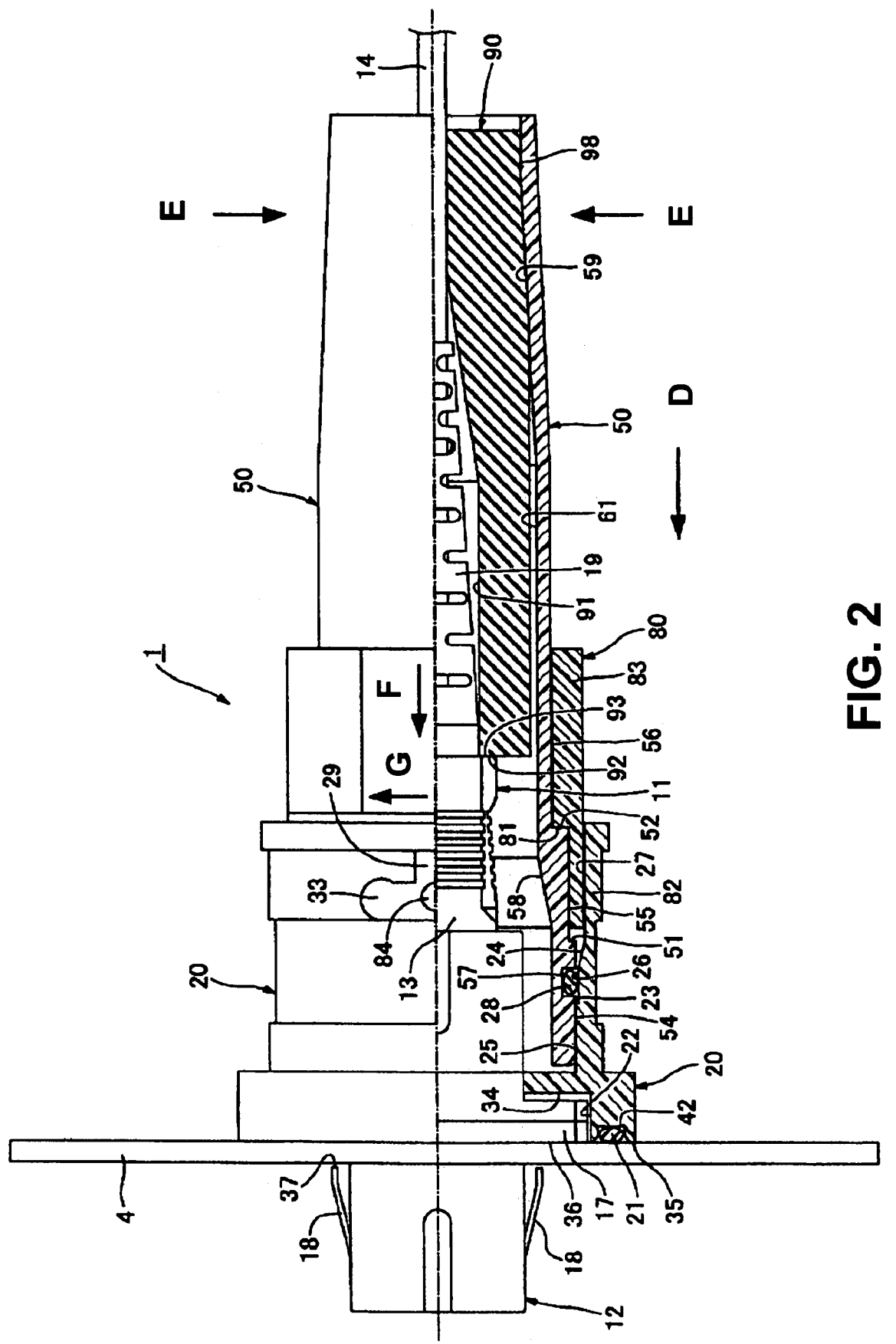
FIG. 2 is a side view of the waterproof device attached to an optical connector.

In FIG. 1(a), an optical connector 2 includes a first connector component 11 and a second connector component 12 that is detachably fitted into the first connector component 11. The first connector component 11 includes a body section 13, a cable 14 extending rearwardly from the body section 13, and a booth 19 to cover a portion of the cable 14. The cable 14 has a circular cross-section but may take a square cross-section such as a drop cable. The front end of cable 14 is connected to a ferrule 15, a portion of which projects forwardly from the body section 13. The second connector component 12 has a pair of substantially identical members so that the first connector component 11 may fit into it from both sides. An aperture is provided in the center thereof so that one first connector component 11 is fitted into the aperture from one side and another first connector component 11 is fitted into the aperture from the other side.

The ferrules 15 of the first connector components 11 are abutted against each other in the second connector component 12 for connection.

The waterproof device 1 for the optical connector 2 includes a first housing member or a substantially cylindrical receptive housing 20, a second housing member or a substantially cylindrical hood member 50, a third housing member or a substantially cylindrical coupling member 80, and a cylindrical seal member 90. The receptive housing 20, hood member 50, and coupling member 80 are made of a relatively hard plastic resin while the seal member 90 is made of a relatively soft material such as rubber having low friction coefficient. Alternatively, the seal member 90 may take a corn shape.

To attach the waterproof device 1 to the optical connector 2, first of all, the second connector component 12 is put in the receptive housing 20 such that the front portion of the optical connector 2 will be covered by the receptive housing 12. A flange 17 is provided on the second connector component 12 such that it fits in an indentation 22 with an abutment face 34 in the receptive housing 20. That is, the second connector component 12 is inserted into the receptive housing 20 in the direction of arrow A in FIG. 1 such that the flange 17 abuts against the abutment face 34. Consequently, the rear portion of the second connector component 12 is supported by the receptive housing 20. The front portion of the second connector component 12 is supported by either a board 4 of equipment (FIG. 2) or another receptive housing 20 of a mating connector. That is, the waterproof device 1 is useful as either a board fixed type or cascade link type. For the board fixed type, the O-ring waterproof packing 21 is put in a groove 42 in a flange 35 of the receptive housing 20, as shown in FIG. 1(*b*), and the flange 35 with screw holes 32 is screwed to the board 4. Alternatively, the tip 37 of a leaf spring 18, which is cantilevered on the second connector component 12, abuts against the board 4 so that the second connector component 12 is attached to the board 4.

After the second connector component 12 is attached to the receptive housing 20, the first connector component 11 is fitted into the second connector component in the direction of arrow B, with the cable 14 put through the coupling member 80 and the hood member 50. A cutout 16 of the second connector component 12 and a cutout 29 of the receptive housing 20 are situated at the same position so that the first connector component 11 is readily fitted into the second connector component 12 by moving a projection 95 of the first connector component 11 in the cutout 29 in the B direction.

After the first connector component 11 is fitted into the second connector component 12, the seal member 90 is attached to the first connector component 11 from side in the C direction to cover the booth 19 and a portion of the cable 14. Alternatively, the seal member 90 may be attached before the first connector component 11 is fitted into the second connector component 12. The central portion 91 of the seal member 90 is made according to the shape of the cable 14 so that the seal member 90 closely covers the cable 14. The seal member 90 is provided with a slit 96 so that the seal member 90 can be attached to the first connector component 11 from side by opening the slit 90 and abutting the abutment section 92 of the seal member 90 against the cable exiting section 93 of the first connector component 11. Alternatively, the seal member 90 may be cut into halves longitudinally instead of the provision of a slit.

Then, the hood member 50, which has been provided on the first connector component 11, is moved in the D direction so that the front end of the hood member 50 abuts against the receptive housing 20 and, thus, the hood member 50 covers the body section 13 of the first connector component 11 and the entire seal member 90.

Finally, the coupling member 80 is moved along the hood member 50 in the D direction and attached to the receptive housing 20. At this point, the hood member 50 engages with the coupling member 80 so that the hood member 50 is moved to the receptive housing 20 and fixed by the coupling member 80. Consequently, the hood member 50, the coupling member 80, and the seal member 90 are fixed to the receptive housing 20 as a unit.

The receptive housing 20 has a relatively short cylindrical form and covers the front portion of a connector for waterproofing. Specifically, when the first connector component 11 is fitted into the second connector component 12, the receptive housing 20 covers a half of the second connector component 12 and the front portion of the first connector component 11. The receptive housing 20 has a stepped section 23 and an inclined section 24 on its inside to form an annular small-diameter section 25, a medium-diameter section 26, and a large-diameter section 27. An L-shaped cutout 29 is provided in the receptive housing 20 for bayonet connection with the coupling member 80.

The hood member 50 has a relatively long cylindrical form having a small step section 51 and a large step section 52 to provide a large-diameter section 54, a medium-diameter section 55, and a relatively long, small-diameter section 56. The hood member 50 has a gradually contracting tail section. When the hood member 50 is attached to the receptive housing 20, the large-diameter section 54 and the medium-diameter section 55 are covered by the receptive housing 20 such that the front and rear ends of the large-diameter section 54 are situated near the small-diameter section 25 and the medium-diameter section 26 of the receptive housing 20, respectively, and the medium-diameter 55 is near the large-diameter section 27 of the receptive housing 20. Especially, the front end of the large-diameter section 54 is inserted into the receptive housing 20 with no gap, thereby preventing loose connection between the receptive housing 20 and the hood member 50. An annular groove 57 is provided on the large-diameter section 54 to receive a waterproof packing 28, such as an O-ring, which completely closes a gap between the medium-diameter section 26 of the receptive housing 20 and the large-diameter section 54 of the hood member 50, thus preventing water from entering the equipment.

A steeply inclined section 58 is provided on the inside of the hood member 50 between the small step section 51 and the large step section 52. The steeply inclined section 58 links a large diameter section 60 that covers the rear portion of the second connector component 12 and the body section 13 of the first connector component 11 and a small diameter section 61 that covers the seal member 90. A gently inclined section 59 extends rearwardly from the small diameter section 61 to provide an inside diameter less than a corresponding outside diameter of the seal member 90. Consequently, the gently inclined section 59 comes into close contact with the rear section 98 of the seal member 90. When the hood member 50 is attached the receptive housing 20, the hood member 50 presses the seal member 90 in the D direction with the close contact between the gently inclined section 59 and the rear section 98 of the seal member 90 while it contracts an end portion of the seal member 90 in the E direction. As a result, the seal member 90 is pressed against the cable 14 by the hood member 50, thus providing a hermetical seal near its rear end. The abutment face 92 of the seal member 90 abuts against the cable exiting section 93 of the first connector component 11 so that the pressure on the seal member 90 by the hood member 50 is applied to the body section 13 of the first connector component 11. This pressure is used to press the first connector component 11 against the second connector component 12. That is, it reinforces the fitting between the first and second connector components 11 and 12.

The coupling member 80 has a relatively short cylindrical form and has an engaging step 81, forming a front thinner section 82 and a rear thicker section 83. When the coupling member 80 is attached to the receptive housing 20, the thinner section 82 is supported in a gap between the large diameter section 27 of the receptive housing 20 and the medium diameter section 55 of the hood member 50 while the engaging step 81 of the coupling member 80 abuts against the large step 52 of the hood member 50 so that the hood member 50 is moved toward the housing 20 by the coupling member 80. A projection 84 is provided on the coupling member 80 corresponding to the L-shaped cutout 29 of the receptive housing 20. The coupling member 80 is bayonet connected to the receptive housing 20 by inserting the projection 84 into the L-shaped cutout 29 and pushing the coupling member 80 in the F direction and rotating it in the G direction to place the projection 84 in the circular recess 33 of the cutout 29. The bayonet connection can be made with a substantially constant force to eliminate the delicate application of force in such a case as screw connection. Also, it can be made while the coupling member 80 and the receptive housing 20 are spaced at a constant distance. When the project 84 of the coupling member 80 is moved straightly along the cutout 29 of the receptive housing 20, the hood member 50 receives an elastic force from the seal member 90 via the engagement between the large step 52 of the hood member 50 and the engaging step 81 of the coupling member 80. This elastic force biases the projection 84 against the recess 33, thus assuring the bayonet connection.

Figure 3:
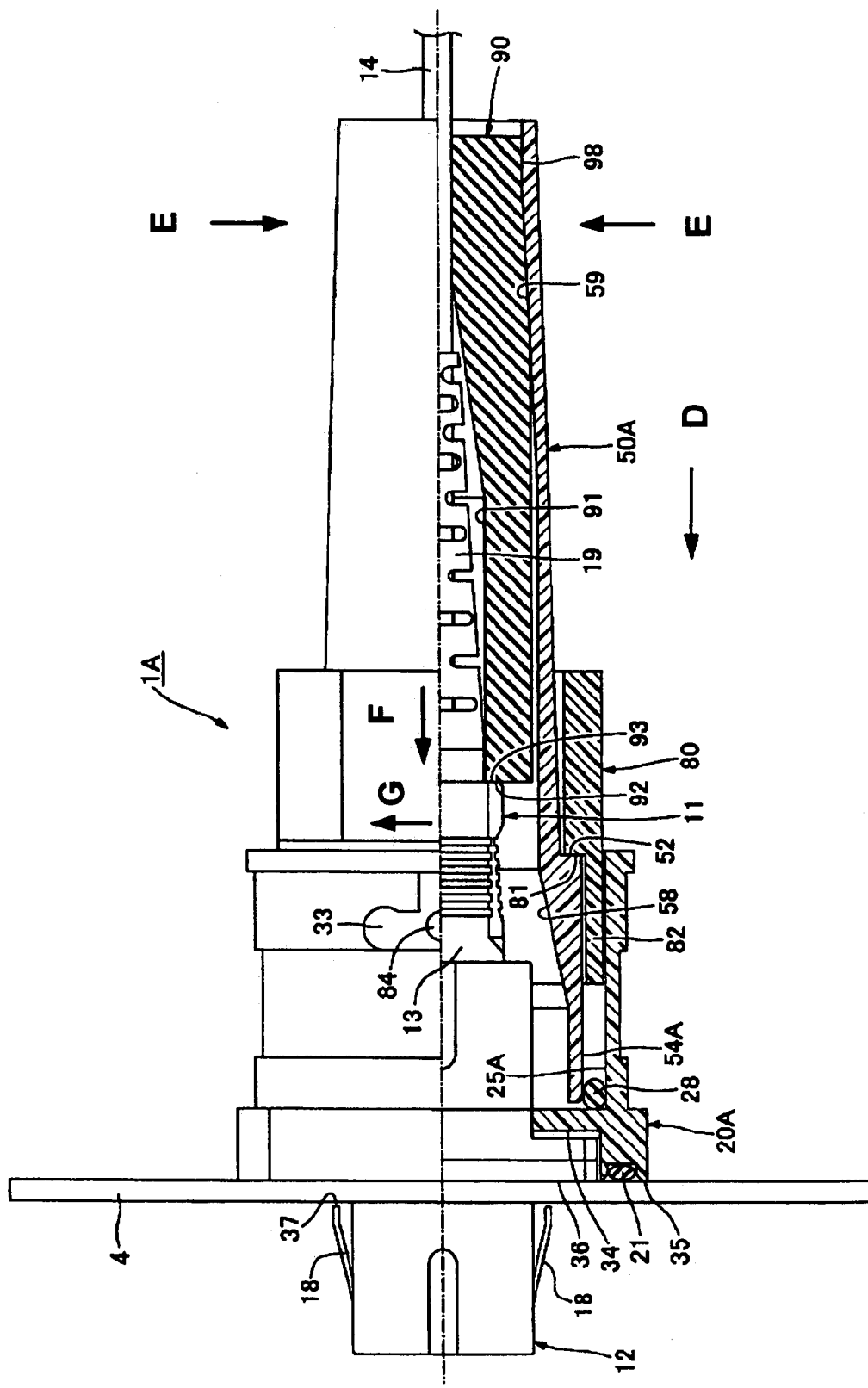
FIG. 3 is a side view of a waterproof device according to a second embodiment of the invention.

In FIG. 3, according to the second embodiment of the invention, no annular groove, such as the one 57 in FIG. 2, is provided in a small diameter section 25A of a hood member 50A. Consequently, the waterproof packing 28 is disposed on the front portion of the large diameter section 54A between the large diameter section 54A and the small diameter section 25A. Even if the waterproof packing 28 is not accurately positioned, it can perform the waterproof function. The no groove structure eliminates the need for such an inclined face as the step section 23 in FIG. 2, thus simplifying the metal mold and reducing the manufacturing cost.

Figure 4:
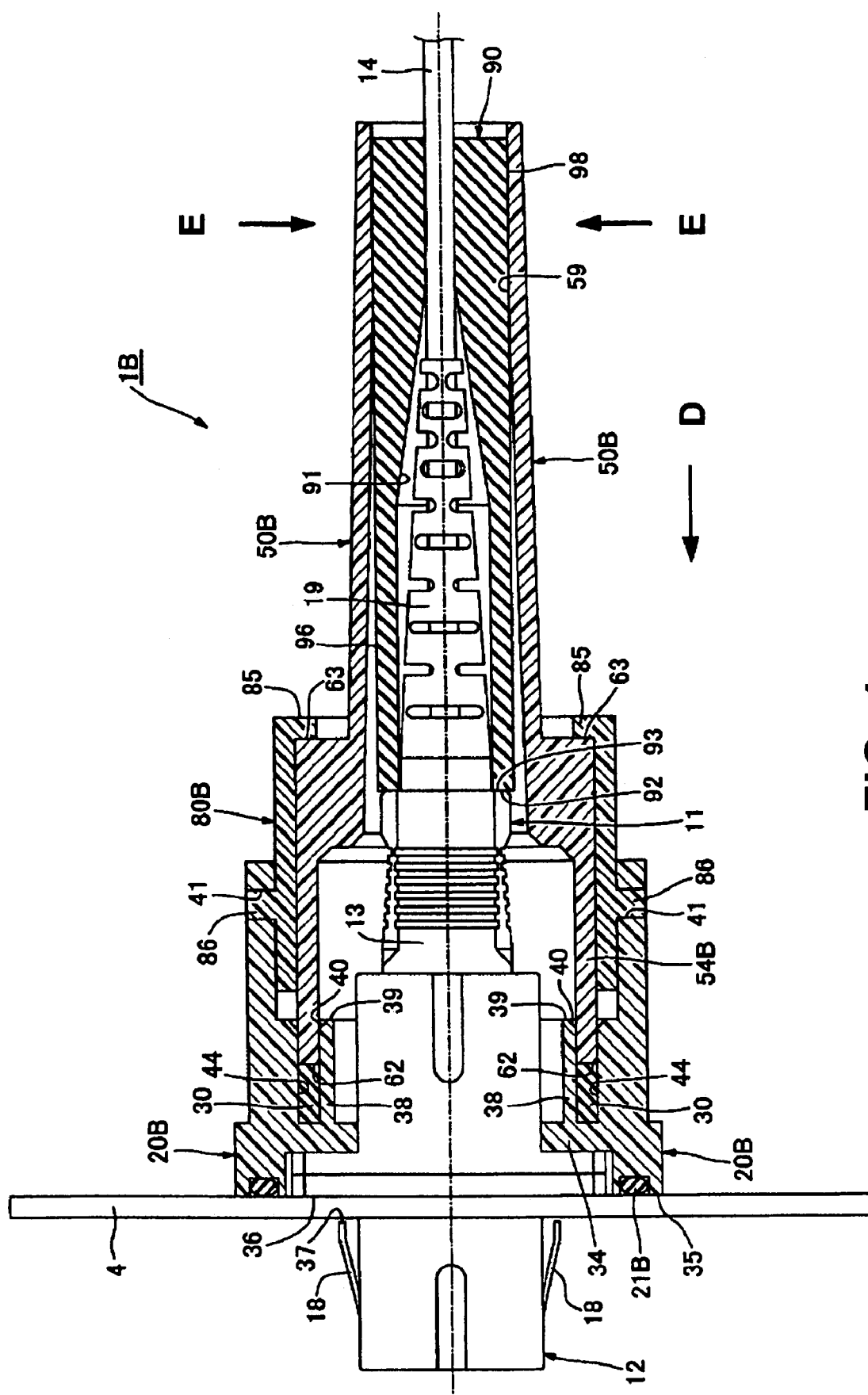
FIG. 4 is a side view of a waterproof device according to a third embodiment of the invention.
Figure 5:
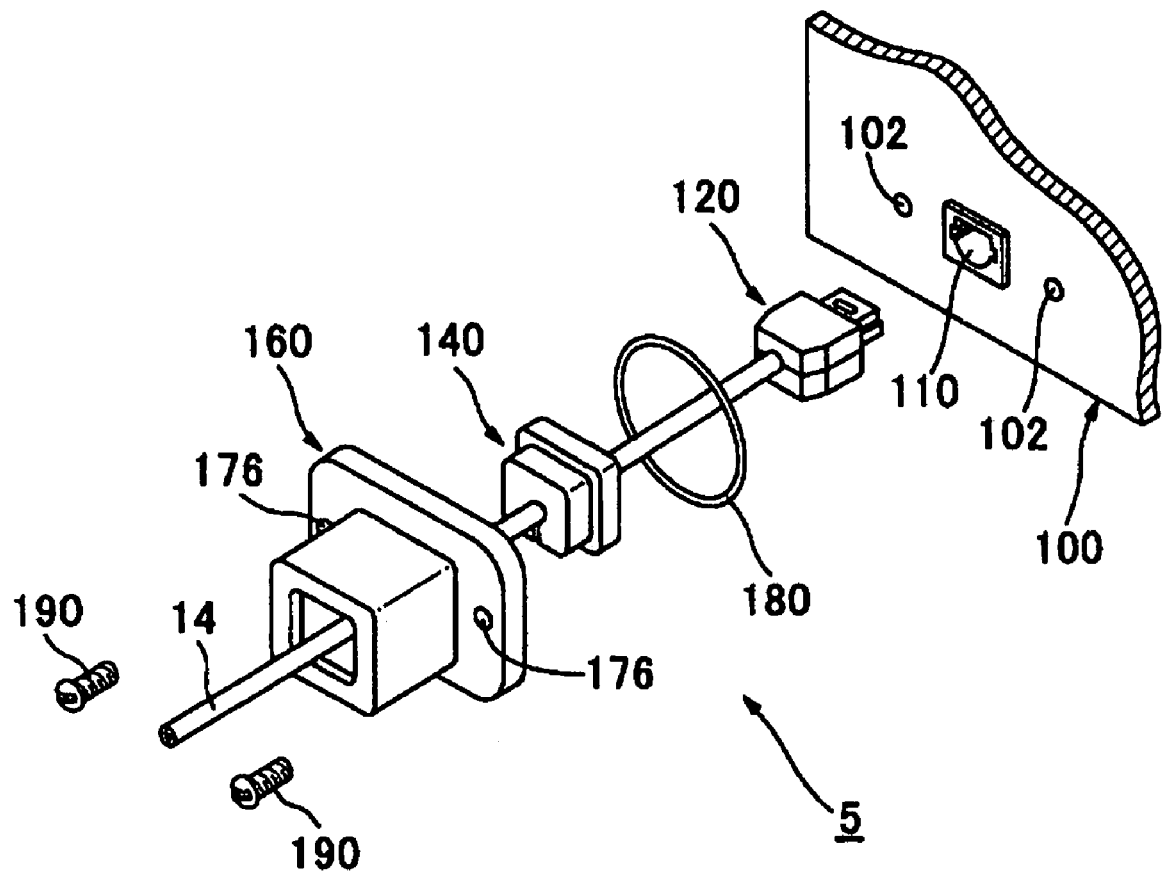
FIG. 5 is an exploded perspective view of a conventional waterproof device

In FIG. 4, according to the third embodiment of the invention, a wide ring 30 having a rectangular cross-section is used for the waterproof packing 28. It is fitted in a recess 44 provided on the front portion of the receptive housing 20B and pressed forwardly by the front end 62 of the hood member 50. The edge 39 of an annular projection 38 is tapered at 40 so as to facilitate insertion of a large diameter section 54B into the recess 44. A rear support section 85 extends inwardly from the rear end of a coupling member 80B, replacing the large diameter step 52 or engaging step 81 of the first or second embodiment. The coupling member 80B is attached to the receptive housing 20B by pressing the rear support section 85 against the rear edge 63 of the hood member 50B. A projection 86 of the coupling member 80B is fitted into a hole 41 of the receptive housing 20B for detachable attachment. Alternatively, the bayonet connection may be used as in the first and second embodiments. The waterproof device according to the invention may be applied to an electrical connector as well as an optical connector.

The invention claimed is:

1. A waterproof device comprising:
   a first housing member for covering a front portion of a connector from which a cable extends rearwardly;
   an elastic member for covering at least a portion of said cable;
   a cylindrical second housing member attached to said first housing member such that it covers and presses said elastic member against said cable; and
   a third housing member detachably attached to said first housing member so as to press said second housing member against said first housing member such that said second housing member covers a rear portion of said connector.

2. The waterproof device according to claim 1, wherein said elastic member has a substantially constant diameter cylindrical form that has a slit along its longitudinal direction and a central bore shaped correspondingly to the cable.

3. The waterproof device according to claim 1, wherein said third housing member is bayonet-connected to said first housing member.

4. The waterproof device according to claim 1, wherein said connector consists of a first connector component to which said cable is connected and a second connector component detachably fitted into said first connector component; said elastic member attached to said first connector component; said first housing member attached to said second connector component; and said first connector component fitted into said second connector component before said second and third housing members are detachably attached to said first housing member.

5. The waterproof device according to claim 1, wherein said second housing member is movable toward said first housing member along said cable;
   said third housing member is movable toward said first housing member along said cable together with said second housing member and fixed to said first housing member against an elastic force of said elastic member.

6. The waterproof device according to claim 5, wherein said cylindrical second housing member has a tailing section having gradually reduced diameter so that when said second housing member is moved toward said first housing member, said tailing section contracts a rear portion of said elastic member, thus pressing said rear portion against said cable.

7. The waterproof device according to claim 5, wherein said second housing member is provided with a rearwardly facing step and said third housing member is provided with a forwardly facing step such that said rearwardly facing step abuts against said forwardly facing step to engage said second and third housing members.

8. The waterproof device according to claim 5, wherein said second housing member is provided with a rearwardly facing section and said third housing member is provided with an abutment face extending toward a center such that said rearwardly facing section abuts against said abutment face to engage said second and third housing members.

9. The waterproof device according to claim 1, wherein said second housing member is provided with waterproof means for closing a gap between said first and second housing member.

10. The waterproof device according to claim 9, wherein said waterproof means is a ring shaped member fitted in a groove provided in a front portion of said second housing member.

* * * * *